United States Patent [19]

Sakurai et al.

[11] 4,337,118
[45] Jun. 29, 1982

[54] NUCLEAR REACTOR POWER MONITORING SYSTEM

[75] Inventors: Mikio Sakurai, Mito; Yuichiro Yoshimoto; Hiroshi Kodama, both of Hitachi, all of Japan

[73] Assignee: Hitachi, Ltd., Tokyo, Japan

[21] Appl. No.: 84,437

[22] Filed: Oct. 12, 1979

[30] Foreign Application Priority Data

Oct. 16, 1978 [JP] Japan .................. 53-126196

[51] Int. Cl.³ .............................................. G21C 7/00
[52] U.S. Cl. ..................... 376/210; 376/216
[58] Field of Search ............. 176/20 R, 24, 50, 54–56

[56] References Cited

U.S. PATENT DOCUMENTS

| | | | |
|---|---|---|---|
| 3,565,760 | 2/1971 | Parkos et al. | 176/24 |
| 3,621,926 | 11/1971 | Townsend | 176/50 |
| 3,778,347 | 12/1973 | Giras et al. | 176/20 R |
| 3,791,922 | 2/1974 | Musick | 176/20 R |
| 3,933,580 | 1/1976 | Aleire et al. | 176/20 R |
| 3,979,255 | 9/1976 | Bulgier et al. | 176/20 R |
| 4,055,463 | 10/1977 | Torres | 176/24 |
| 4,104,117 | 8/1978 | Parziale et al. | 176/20 R |
| 4,108,720 | 8/1978 | Sato et al. | 176/24 |
| 4,153,506 | 5/1979 | Makai et al. | 176/20 R |
| 4,170,516 | 10/1979 | Shinbo et al. | 176/20 R |

FOREIGN PATENT DOCUMENTS

| | | | |
|---|---|---|---|
| 2206234 | 8/1973 | Fed. Rep. of Germany | 176/20 R |
| 52-46294 | 12/1977 | Japan | 176/24 |
| 54-111090 | 8/1979 | Japan | 176/20 R |
| 54-140088 | 11/1979 | Japan | 176/24 |
| 54-150585 | 11/1979 | Japan | 176/20 |

OTHER PUBLICATIONS

ANS. Trans. vol. 27 (11/27–12/02/77) pp. 838–842 Meyer et al.

Primary Examiner—Sal Cangialosi
Attorney, Agent, or Firm—Craig and Antonelli

[57] ABSTRACT

A nuclear reactor power monitoring system for monitoring the power level of a reactor and preventing an excessive rise thereof attributable to a transient increase in the core coolant flow rate before the reactor is scrammed. The system include an operating region monitor (ORM) for blocking the increase in the core coolant flow rate or running-back the flow rate when the power level exceeds a predetermined coolant block threshold power level which is a function of the core coolant flow rate.

6 Claims, 11 Drawing Figures

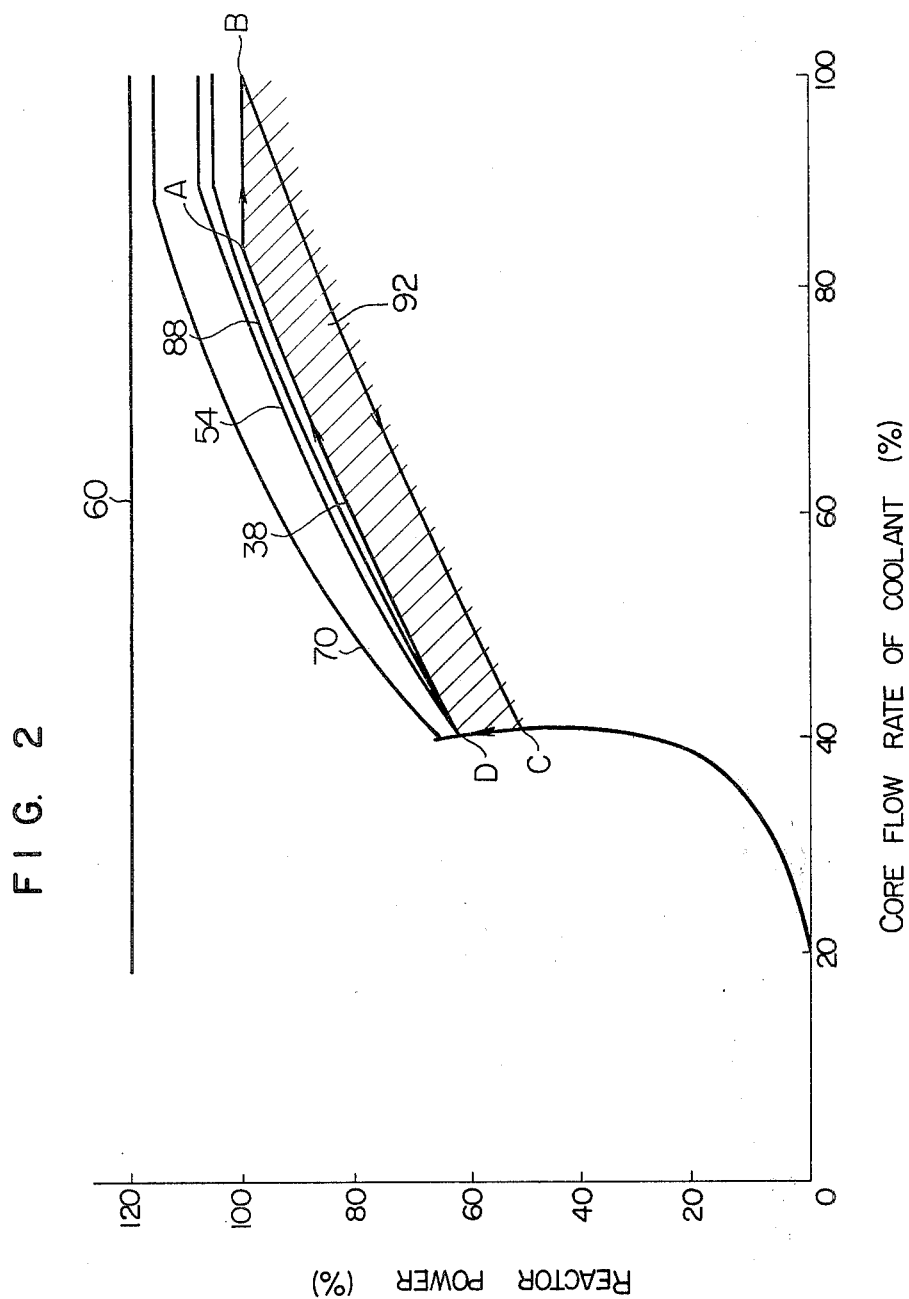

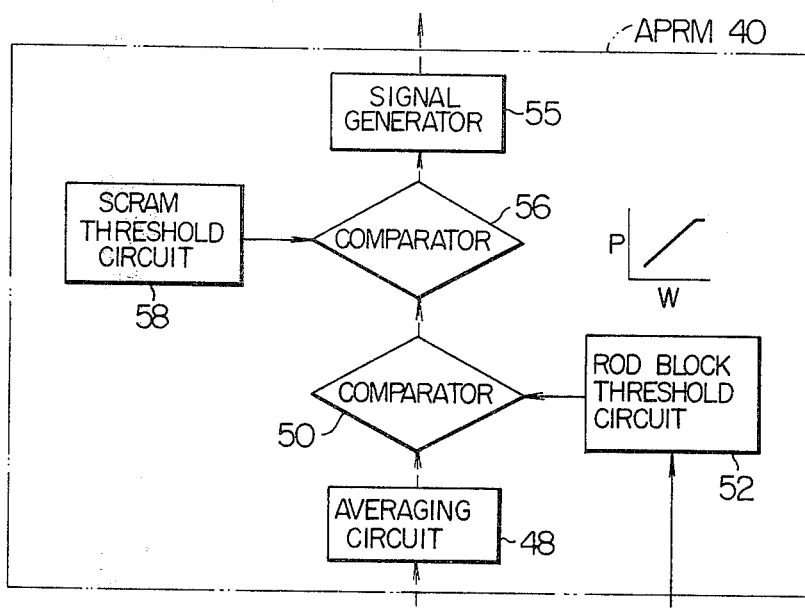
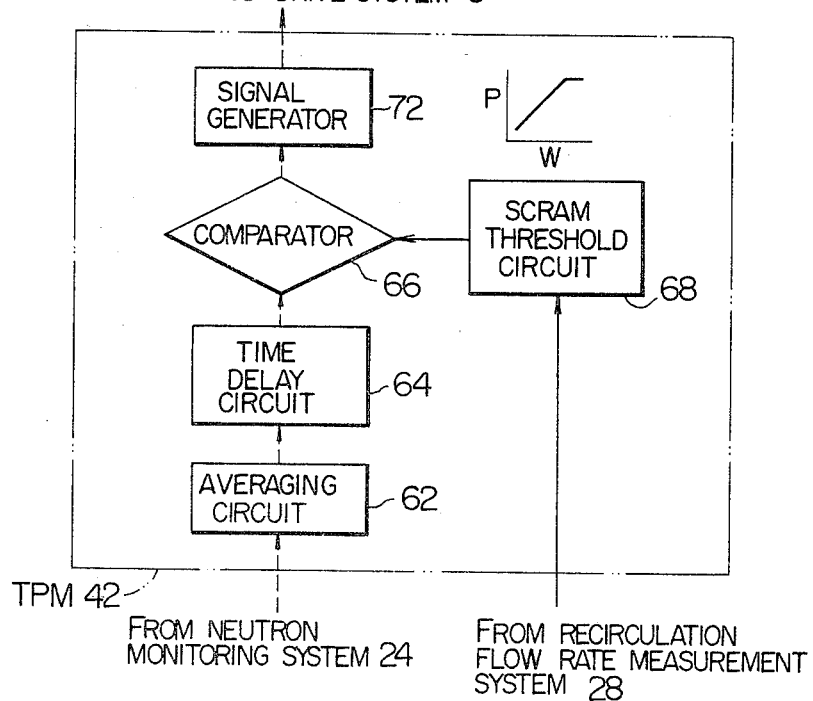

NUCLEAR REACTOR POWER MONITORING SYSTEM

BACKGROUND OF THE INVENTION

This invention relates to nuclear reactor power monitoring systems for monitoring the power level of a reactor and preventing an excessive rise thereof, and more particularly it is concerned with a system for controlling the core coolant flow rate of a nuclear reactor particularly designed for preventing an excessive rise in power level attributable to a transient increase in the core coolant flow rate.

Generally, control of the power level of a boiling-water nuclear reactor (BWR) is effected not only by practicing selective operation of a plurality of neutron absorbing control rods which are movable into and out of the reactor core, but also by effecting adjustment of the core coolant flow rate in combination with the selective operation of the control rods.

The principle of power control of BWR relying on the adjustments of the core coolant flow rate is that the relation between variations in the manner of production of voids in the core caused by changes in the core coolant flow rate and the negative reactivity coefficient of voids can be utilized for controlling reactor power. More specifically, in increasing the nuclear reactor power, the core coolant flow rate is increased to increase reactivity as the volume of voids in the core is transiently reduced, thereby increasing reactor power. This increase in reactor power continues until balance is achieved between the amount of the increase in reactivity in the transition period and the amount of voids newly produced in the core. Thus a new reactor power level is attained.

The core coolant flow is created by leading part of the coolant out of the pressure vessel and driving recirculation pumps which forces the coolant to flow into jet pumps within the pressure vessel. The core coolant flow rate is controlled by a flow control system associated with the recirculation pumps. The core coolant flow does not show the same rate as the recirculation flow. However, there is a uniform functional relation between these two values, so that the core flow rate can be indirectly controlled by controlling the recirculation flow rate. Control of the recirculation flow rate can be effected either by adjusting the opening of flow control valves at the discharge side of the recirculation pumps or by controlling the number of revolutions of the recirculation pumps.

Operation of BWR is practiced in accordance with a predetermined operation plan by the aforesaid selective operation of the control rods and the control of the core coolant flow rate. The operation plan is determined in such a manner that reactor power can be maximized without impairing the integrity of fuels by an excessive rise in power. Core characteristics parameters regarding the integrity of fuels include a maximum linear heat generating rate which is a monitor index for preventing mechanical breakdown of the fuel cladding due primarily to thermal deformation and a minimum critical power ratio (MCPR) which is a monitor index for preventing thermal breakdown of the fuel cladding caused by transition boiling or film boiling of the coolant, both being controlled in such a manner that they do not exceed the respective critical levels that would cause breakdown of the fuel cladding.

During operation of BWR, reactor power may deviate from the aforesaid operation plan for some reason and give rise to an excessive rise in power. To avoid this phenomenon, a core monitoring system is provided. The conventional power monitoring system includes an average power range monitor (APRM), a thermal power monitor (TPM) and a rod block monitor (RBM). These monitors all operate as follows on the basis of signals from a neutron monitoring system including local power range monitors (LPRMs). APRM monitors the power level of the nuclear reactor which is obtained by averaging the local power signals from all LPRMs, and prevents withdrawing of control rods when the power level attained by withdrawing of control rods has reached a predetermined rod block threshold and scrams the nuclear reactor when the power level has reached a predetermined scram threshold as a result of withdrawing of control rods, as increase in the core coolant flow rate and the core pressure, etc. TPM monitors thermal power transferred through fuel cladding surfaces, the thermal power being converted from local power signals from LPRMs through a time delay circuit, and scrams the nuclear reactor when the thermal power has reached a predetermined scram threshold. RBM monitors changes in the readings of LPRMs adjacent to the control rod to be withdrawn and prevents withdrawing of the control rods when the readings reaches a predetermined rod block threshold. APRM and RBM are disclosed, for example, in U.S. Pat. No. 3,565,760 granted to G. R. Parkos et al on Feb. 23, 1971.

In the core monitoring system described hereinabove, withdrawing of control rods is blocked either by APRM or RBM when the power level of the core or the local power level thereof attained by withdrawing of control rods reaches the respective threshold. Thus APRM and RBM suppress an excessive rise in reactor power caused by withdrawing of control rods but do not provide means for suppressing an excessive rise in reactor power caused by a change in the core coolant flow rate. The suppression of the latter excessive power rise is effected by APRM and TPM in the existing circumstances, which scram the nuclear reactor when the power level or thermal power level of the core reaches the corresponding one of their scram thresholds. APRM and TPM also scram the reactor when the reactor power level reaches the corresponding one of their scram thresholds as a result of withdrawing of control rods.

The nuclear reactor continues its operation when withdrawing of control rods is blocked by APRM or RBM, so that the blocked control rods can be actuated again if reactor power is reduced by inserting other control rods or reducing the core coolant flow rate. However, in the event of the core flow rate being increased and the reactor power level being raised by an operator turning some wrong valves or some equipment misoperating, for example, the power level only rises until the scram threshold of APRM or TPM is reached as aforesaid and the reactor is scrammed. As a result, the number of times the reactor is scrammed increases more than is necessary and interfers with the operation of the reactor. Also, when the reactor power level rises as aforesaid, the aforesaid core characteristics parameters such as the maximum linear heat generating rate and minimum critical power ratio may exceed the critical level that may cause breakdown of the fuel cladding. To avoid this accident, it has hitherto been necessary to set the power level of normal operation of a nuclear reactor at a relatively low level to provide reserves for this accident.

Japanese Patent Publication No. 21518/79 published on July 31, 1969 for Tokyo Shibaura Electric Company, Ltd. discloses a control system in which (1) in a slow power increase mode a recirculation coolant flow rate increase rate m or a core coolant flow rate increase rate c is limited to a level lower than the level obtained by calculation performed as predetermined, and (2) in a normal operating mode, a recirculation coolant flow rate threshold M and a core coolant flow rate threshold C are reset only when power density is found to be higher in level than the value obtained at the preceding calculation as calculation thereof is carried out at certain time intervals, to thereby avoid an increase in flow rate above the reset threshold.

In this control system, when the core flow rate falls and power is reduced after the thresholds M and C are reset at a high power level $P_H$ following a slow rise in power, the reset thresholds M and C are kept at a high level. If a rise in flow rate is caused, for example, by the failure of a recirculation flow controller after the power is kept at a low level for some time, the flow rate continues to rise until it reaches the level of M or C. The power level attained at this time would be higher than the power level $P_H$ by an amount corresponding to a reduction in Xenon (neutron absorber) in the core occurring during the time of low level operation of the reactor. Thus, the process for setting the thresholds shown in Japanese Patent Publication No. 21518/79 is such that a flow rate threshold is set at the power level $P_H$ and the threshold, once set, may be kept constant irrespective of power until the power level exceeds $P_H$ again and a fresh threshold is set following recalculation of power density by the computer. Therefore, even if the flow rate rises to the threshold again in the interval due to a reduction in power and a variation in the amount of Xenon, there is no assurance that power will be lower than the threshold $P_H$. In fact, there is no express mention of the amount of Xenon in formulas (1)–(12) described in Japanese Patent Publication No. 21518/79.

SUMMARY OF THE INVENTION

A principal object of the present invention is to provide a system for controlling the core coolant flow rate which enables an excessive rise in power level to be suppressed before the nuclear reactor is scrammed, when the excessive power rise is caused by an increase in the core coolant flow rate.

Another object is to provide a nuclear reactor power monitoring system which enables an excessive rise in power level to be suppressed so as to permit the nuclear reactor to continue its operation when the excessive power rise is caused by an increase in the core coolant flow rate.

A still another object is to provide a nuclear reactor control system which enables a variation in the core characteristic parameters such as a minimum critical power ratio and a maximum linear heat generating rate to be minimized when an excessive rise in power level is caused for any reasons including an increase in the core coolant flow rate, thereby preventing the critical level causing breakdown of the fuel cladding from being exceeded by these characteristics parameters even if a power level for normal operation is set at a relatively high level.

A further object is to provide a system for controlling the core coolant flow rate of a nuclear reactor which enables an excessive rise in power level exceeding a threshold level to be prevented by all means when the excessive rise is caused by an increase in the core coolant flow rate no matter what the situation bringing about the increase may be.

According to one aspect of the invention, there is provided, in a nuclear reactor having a core including means for recirculating a coolant through the core to make a core coolant flow, means associated with said recirculating means for controlling the core coolant flow rate, means for detecting the power level of the reactor and producing a signal indicative of the detected power level, and means for detecting the core coolant flow rate and producing a signal indicative of the detected flow rate, the combination of (a) means responsive to the signal from said flow rate detecting means for producing a signal indicative of the threshold power level at the detected flow rate, the threshold being previously determined and inputted to said means as a function of the core coolant flow rate, (b) means for receiving and comparing the signals from said power level detecting means and said threshold power level signal producing means, and (c) means for producing a coolant block signal or coolant run-back signal when the signal from said power level detecting means exceeds the signal from said threshold power level signal producing means, said coolant block signal or run-back signal being received by said flow rate control means whereby said recirculation means is operated to block the change in the core coolant flow rate or run-back the flow rate.

In the aforesaid combination, said flow control means is adapted to control the flow rate along a predetermined flow control line to operate the reactor, and said threshold power level may be about 103 to 108% of that on said flow control line at the rated flow rate and at flow rates adjacent to the rated flow rate, and said threshold power level is about 102 to 107% of that on said flow control line in a substantial range of flow rates below the first-mentioned flow rates.

According to another aspect of the invention, there is provided a nuclear reactor power monitoring system for monitoring the power level of a nuclear reactor and preventing an excessive rise of the power level, the nuclear reactor including a core, a plurality of control rods selectively insertable in said core, means for recirculating a coolant through the core to make a core coolant flow, and means associated with said recirculating means for controlling the core coolant flow rate, the control system comprising in combination: (a) first means for detecting the power level and producing a signal indicative of the detected power level; (b) second means for detecting the core coolant flow rate and producing a signal indicative of the detected flow rate, (c) first monitor means responsive to the signals from said first and second detecting means for blocking the withdrawing of the control rods when the detected power level exceeds a predetermined rod block threshold power level at the detected flow rate; (d) second monitor means responsive to the signals from said first and second detecting means for initiating a scram action when the detected power level exceeds a predetermined scram threshold power level at the detected flow rate; and (e) third monitor means responsive to the signals from said first and second detecting means for blocking the change in the core coolant flow rate or running-back the flow rate when the detected power level exceeds a predetermined coolant block threshold power level at the detected flow rate.

In the aforesaid monitoring system, said third monitor means may include an averaging circuit for receiving the signal from said first detecting means and producing a signal indicative of the average of the detected power level, a coolant block threshold circuit for receiving the signal from said second detecting means and producing a signal indicative of the coolant block threshold power level at the detected flow rate, the threshold being previously determined and inputted to said threshold circuit as a function of the core coolant flow rate, a comparator for receiving and comparing the signals from said averaging circuit and said threshold circuit, and a signal generating circuit for producing a coolant block signal or coolant run-back signal when the signal from said averaging circuit exceeds the signal from said threshold circuit, said coolant block signal or run-back signal being received by said flow control means whereby said recirculating means is operated to block the change in the core coolant flow rate or run-back the flow rate. Moreover, in the monitoring system, said flow control means is adapted to control the flow rate along a predetermined flow control line to operate the reactor, and said coolant block threshold power level may be about 103 to 108% of that on said flow control line at the rated flow rate and at flow rates adjacent to the rated flow rate and is about 102 to 107% of that on said flow control line in a substantial range of flow rates below the first-mentioned flow rates.

BRIEF DESCRIPTION OF THE DRAWINGS

FIG. 2 is a diagram showing a flow rate control line, a rod block threshold line and a scram threshold line of an APRM, a scram threshold line of a TPM and a coolant block threshold line of an operating region monitor (ORM), all of the nuclear reactor power control system shown in FIG. 1;

FIG. 3 is a schematic diagram of the APRM shown in FIG. 1;

FIG. 4 is a schematic diagram of the TPM shown in FIG. 1;

DESCRIPTION OF THE PREFERRED EMBODIMENT

Figure 1:
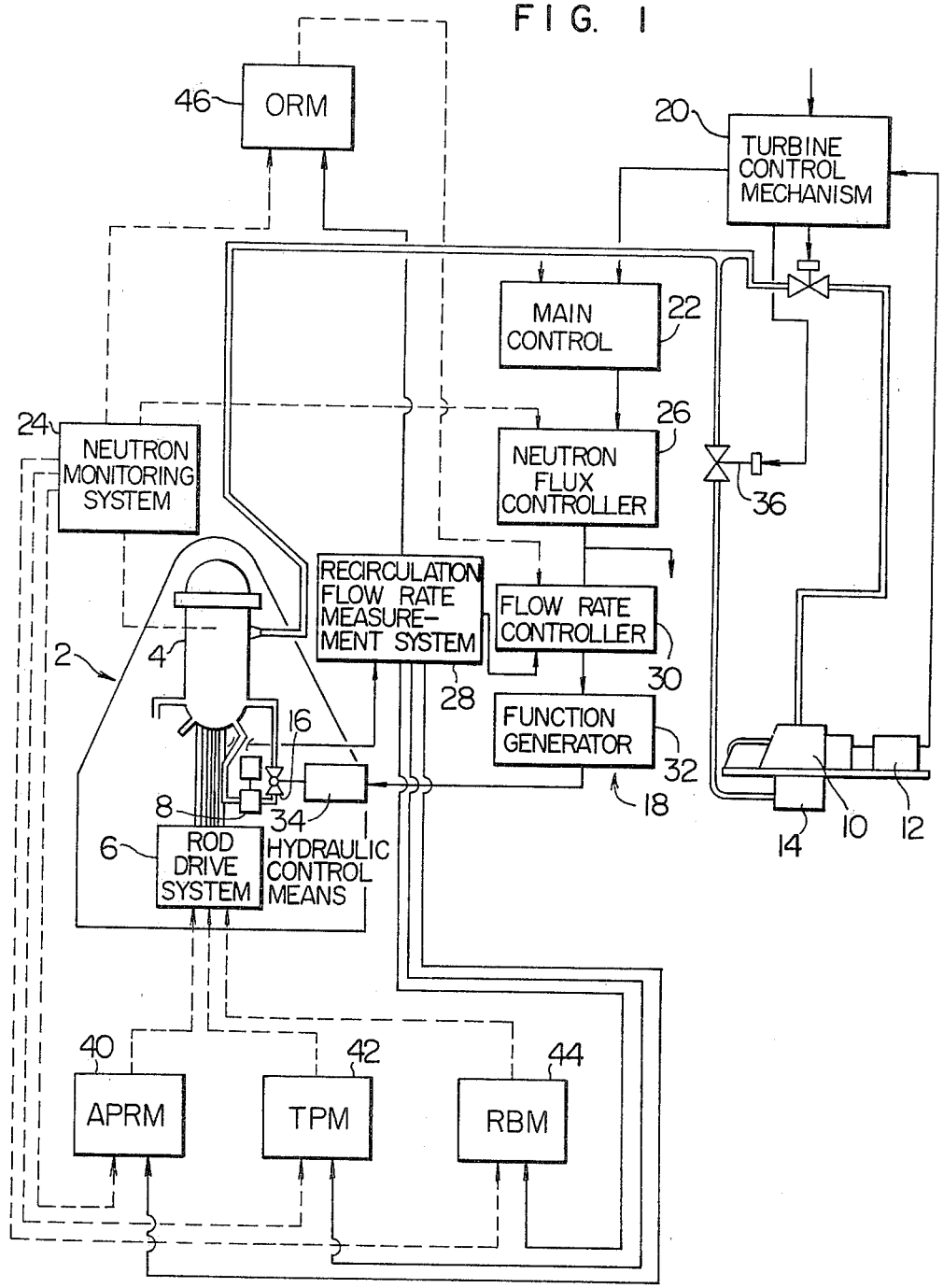
FIG. 1 is a schematic diagram of a nuclear reactor power plant provided with the power control system comprising one embodiment of the invention.

In FIG. 1, there is shown a nuclear power plant including a boiling-water reactor (BWR) 2 provided with a core, not shown, in a pressure vessel 4. A plurality of control rods, not shown, are selectively moved into and out of the core by a rod drive system 6. Contained in the pressure vessel 4 is a coolant (light water) which is recirculated through the core by recirculation pumps 8 which receive part of the coolant and forces it to flow into jet pumps within the pressure vessel so that the coolant flows upward through fuel assemblies in the core. The heat produced by the fuel assemblies is transferred to the coolant and a head of steam is produced in the upper portion of the pressure vessel 4. The steam is supplied to a turbine 10 which drives an electrical generator 12. The turbine 10 exhausts to a condenser 14 and the resulting condensate is returned as feedwater to the pressure vessel 4 through conduit means, not shown.

Located on the discharge side of each recirculation pump 8 is a control valve 16 having its opening varied by a flow control system 18, to adjust the recirculation flow rate of coolant and thus control the core coolant flow rate. Alternatively, control of the core coolant flow rate may be effected by controlling the number of revolutions of the recirculation pumps 8.

The flow control system 18 will be described in detail. A reactor power change demand signal is applied to a main controller 22 either manually or as a load speed deflection signal from a turbine control mechanism 20. A neutron flux controller 26 produces a flow rate demand signal as a function of the difference between an output signal of the main controller 22 and a detected value signal of a neutron monitoring system 24. A flow rate controller 30 supplies a signal through a function generator 32 to hydraulic control means 34 for the control valves 16 so as to bring the difference between the output signal of the neutron flux controller 26 and the detected value signal of a recirculation flow rate measurement system 28 to nil. The openings of the control valves 16 are adjusted by this signal to thereby control the recirculation flow rate and thus the core flow rate to a demanded level. Control is effected by a similar system when control of the recirculation flow rate is effected by adjusting the number of revolutions of the recirculation pump 8. 36 is a turbine bypass valve.

One example of the operation plan of a BWR which may be practiced by controlling the core coolant flow rate by this flow control system 18 will be described by referring to FIG. 2. In FIG. 2, the abscissa represents the core flow rate, and the ordinate indicates the reactor power level. As aforesaid, although the core flow does not show the same rate as the recirculation flow, there is a uniform relation between them. Thus, it will be noted that the core flow rate and the recirculation flow rate can be substituted for each other, and the core flow rate can be detected by the recirculation flow rate measurement system 28. At initial stages of operation of the reactor, the reactor is operated at point A on a flow rate control curve 38. With the lapse of time, a reduction is caused in reactivity owing to fuel consumption, resulting in a fall in reactor power. To compensate for this reduction in reactor power, the core flow rate is increased to maintain the reactor power at a high level by utilizing a change in the manner in which voids are formed in the reactor. By gradually increasing the core flow rate in this way, it is possibel to maintain the reactor power at a desired level for about one to two months. After the core flow rate has reached 100% or when operation of the reactor is performed at point B, no further increase in flow rate is permissible, so that the core flow rate is temporarily reduced to move the reactor operating point to C at which reactor power is reduced. By changing the control rod insertion ratio at point C, the reactor operating point moves from C to D, and then returns to point A following an increase in the core flow rate. Thus the reactor is operated in a cycle lasting one to two months.

In order to prevent an excessive rise in reactor power which might result from deviation of the operation of the reactor from the aforesaid plan during operation of the plant, there is provided a core monitoring system including an average power range monitor (APRM) 40, a thermal power monitor (TPM) 42 and a rod block monitor (RBM) 44, which receive signals from the neutron monitoring system 24 and recirculation flow rate measurement system 28 and transmits a rod block signal or scram signal to the rod drive system 6. The core monitoring system further includes an operating region monitor (ORM) 46 which is operative, when an excessive rise in reactor power is caused particularly by an increase in the core flow rate, to block the increase in the core flow rate or run-back the flow rate upon the power level reaching a predetermined threshold short of the scram threshold. More specifically, ORM 46 receives signals from the neutron monitoring system 24 and recirculation flow rate measurement system 28 and transmits a coolant block signal or run-back signal to the flow controller 32 of the flow control system 18 subsequently to be described.

APRM 40 will now be described by referring to FIG. 3. APRM 40 includes an averaging circuit 48 for receiving signals from the neutron monitoring system 24 including a plurality of local power range monitors (LPRMs) and averaging these signals to produce the power level of the reactor. The signal from the averaging circuit 48 is transmitted to a comparator 50. Meanwhile a rod block threshold circuit 52 is set beforehand at a power level of rod block threshold as a function of the core coolant flow rate as shown at a line 54 in FIG. 2. The rod block threshold circuit 52 receives a signal from the recirculation flow rate measurement system 28 and transmits to the comparator 50 a threshold level signal corresponding to the prevailing flow rate. Upon receiving these signals from the two circuits 48 and 52, the comparator 50 compares them and transmits a comparison signal to a signal generator 55 which transmits, when the power level is higher than the threshold level, a rod block signal to the rod drive system 6. The signal from the averaging circuit 48 is also transmitted to another comparator 56 which also receives a signal from a scram threshold circuit 58. The scram threshold circuit 58 is set beforehand at a power level of scram threshold as shown at a line 60 in FIG. 2. The second comparator 56 compares the signals from the circuits 48 and 58 and transmits a comparison signal to the signal generator 55 which transmits, when the power level is higher than the threshold level, a scram signal to the rod drive system 6.

Thus, APRM 40 monitors a rise in the power level of the reactor transmits a rod block signal to the drive system 6 when the power level has reached the rod block threshold line 54 shown in FIG. 2, to thereby block control rod withdrawing. For example, when the power level reaches about 106% of the rated power in a rated power operation, control rod withdrawing is blocked. Also, APRM 40 monitors the power level of the reactor which might be caused primarily by control rod withdrawing, an increase in flow rate and a rise in the pressure in the pressure vessel 4 caused by shutoff of the load or the like. When this power level reaches the scram threshold line 60 shown in FIG. 2, APRM 40 transmits a scram signal to the rod drive system 6 to scram the reactor. Scramming takes place when the power level reaches about 120% of the rated power, for example.

TPM 42 will now be described by referring to FIG. 4. Like APRM 40, TPM 42 includes an averaging circuit 62 for receiving signals from LPRMs of the neutron monitoring system 24 and averaging local power levels to produce the power level of the reactor. The averaging circuit 62 supplies a signal to a time delay circuit 64 for conversion to a thermal power level. The delay circuit 64 transmits a signal to a comparator 66 to which a signal from a scram threshold circuit 68 is also supplied. The scram threshold circuit 68 is set beforehand at a power level of scram threshold as a function of the core coolant flow rate as indicated by a line 70 in FIG. 2, for example, and transmits to the comparator 66 a threshold level signal corresponding to the prevailing core coolant flow rate upon receipt of a signal from the recirculation flow rate measurement system 28. The comparator 66 compares these two signals from the circuits 64 and 68 and transmits a comparison signal to a signal generator 72 which transmits, when the thermal power level is higher than the threshold level, a scram signal to the rod drive system 6.

Thus, TPM 42 monitors a rise in the thermal power level which might be cause primarily by control rod withdrawing and a rise in the flow rate, and supplies a scram signal to the rod drive system 6 when the thermal power level has reached the scram threshold line 70 shown in FIG. 2, thereby scramming the reactor. The reactor is scrammed in rated power operation when the thermal level reaches about 115% of the rated power, for example.

Figure 5:
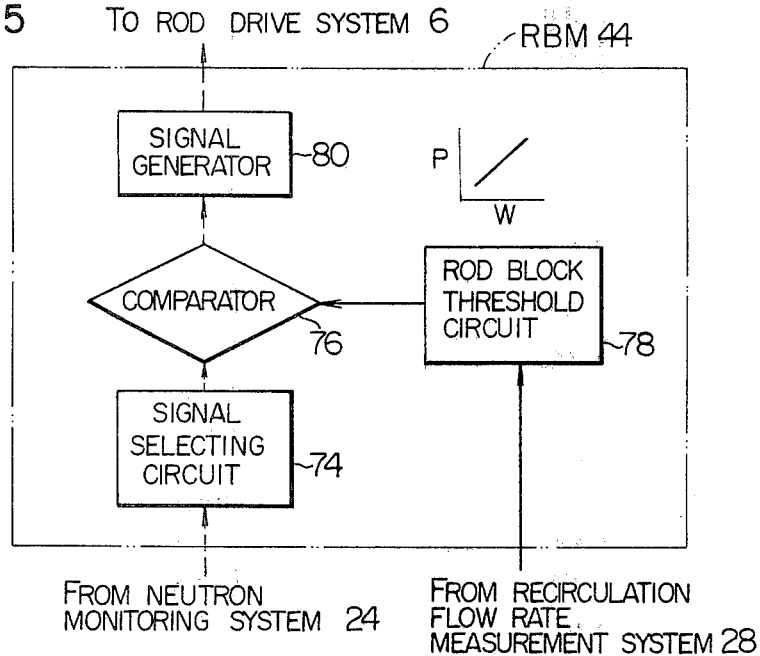
FIG. 5 is a schematic diagram of the RBM shown in FIG. 1.

RBM 44 will now be described by referring to FIG. 5. RBM 44 includes an LPRMs signal selecting circuit 74 for receiving signals from LPRMs of the neutron monitoring system 24 for selection of these signals. The circuit 74 supplies a signal to a comparator 76 to which a signal from a rod block threshold circuit 78 is also supplied. The rod block threshold circuit 78 is set at a power level of rod block threshold beforehand as a function of the core coolant flow rate and transmits to the comparator 76 a threshold level signal corresponding to the prevailing core coolant flow rate upon receipt of a signal from the recirculation flow rate measurement system 28. The power level of rod block threshold at which the circuit 78 is set is not shown in FIG. 2. However, the power level is generally below the line 54 by about 1–3%. The comparator 76 compares the signals from the two circuits 74 and 78 and transmits a comparison signal to a signal generator 80 which transmits, when the selected local power level is higher than the threshold level, a rod block signal to the rod drive system 6.

Thus, RBM 44 monitors a rise in the local power level which might be caused by control rod withdrawing and transmits, when the local power level reaches the rod block threshold set beforehand, a rod block signal to the rod drive system 6 to block control rod withdrawing.

The nuclear reactor continues its operation even if the control rod withdrawing is blocked by APRM 40 or RBM 44. It is possible to operate again the blocked control rods if other control rods are inserted or the core coolant flow rate is reduced to thereby reduce the power level.

Figure 6:
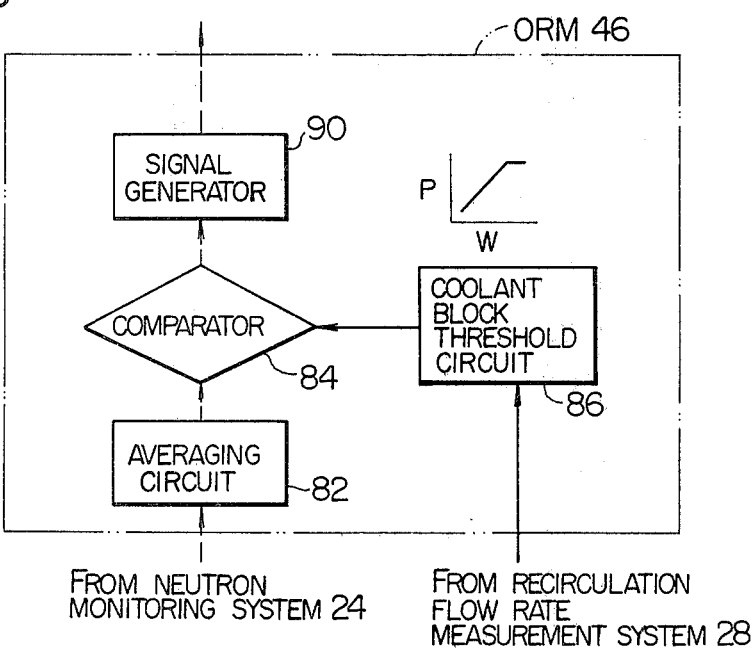
FIG. 6 is a schematic diagram of the ORM shown in FIG. 1.

Last but not the least important is an operating region monitor (ORM) 46 which constitutes the characterizing feature of the present invention. Referring to FIG. 6, ORM 46 includes an averaging circuit 82 for receiving signals from LPRMs of the neutron monitoring system 24 and averaging the local power levels to produce the power level of the reactor. The averaging circuit 82 transmits a signal to a comparator 84. ORM 46 also comprises a coolant block threshold circuit 86 for receiving a signal from the recirculation flow rate measurement system 28. The circuit 86 is set at a power level of coolant block threshold determined as a function of the core coolant flow rate as indicated by a line 88 in FIG. 2, and transmits to the comparator 84 a threshold level signal corresponding to the prevailing core coolant flow rate upon receipt of a signal from the system 28. The comparator 84 compares the two signals from the circuits 82 and 86 supplies a comparison signal to a signal generator 90 which transmits, when the power level is higher than the threshold level, a coolant block signal to the flow rate controller 30 of the flow control system 18. The flow rate controller 30 adjusts the openings of the control valves 16 through the function generator 32 and hydraulic control means 34 so as to block the increase in the recirculation flow rate and thus the increase in the core coolant flow rate, thereby maintaining the core flow rate at the blocked level. Thereafter, the core flow rate is manually returned to a normal operating region 92 as shown in FIG. 2.

Alternatively, the signal generator 90 may be modified to generate a coolant run-back signal. In this case, the flow controller 30 which receives the coolant run-back signal adjusts the openings of the control valves 16 through the function generator 32 and hydraulic control means so as to automatically run-back or reduce the recirculation flow rate and thus the core coolant flow rate to a minimum rate. The signal generator 90 may be further modified to selectively produce a coolant block signal or a coolant run-back signal.

Thus, ORM 46 monitors the reactor power level which might be caused by an increase in the core coolant flow rate. When the reactor power level reaches a coolant block threshold line 88 shown in FIG. 2, ORM 46 transmits a coolant block signal or a coolant runback signal to the flow control system 18, to thereby block the increase in the core coolant flow rate or to thereby run-back the core coolant flow rate. Thus an excessive increase in reactor power which might otherwise be caused by an increase in the core coolant flow rate can be suppressed before the need to scram the reactor arises, and thus operation of the reactor can be continued.

The circuit 86 is set beforehand at a power level of coolant block threshold by analysis in such a manner that when the power level is caused to rise by an increase in flow rate, the blocking or running-back can be effected to keep the core characteristics parameters such as the maximum linear heat generating rate and minimum critical power ratio from reaching their critical levels that may cause the breakdown of the fuel cladding. In the embodiment shown in FIG. 2, the coolant block threshold line 88 has the same starting point D as the flow rate control line 38 and is generally situated slightly above line 38. More specifically, the threshold level is about 105% of the rated power level at the rated flow rate and at flow rates adjacent to the rated flow rate and is about 103% of the power level on the flow rate control line 38 in a substantial range of flow rates below these flow rates. Generally, the threshold level at the rated flow rate and flow rates adjacent to the rated flow rate can be set at a value in the range between 103 and 108% of the rated power level, and the threshold level in a substantial range of flow rates below these flow rates can be set at a value in the range between 102 and 107% of the power level for the flow control line 38.

As apparent from the foregoing, according to the invention, there is provided, in addition to the APRM 40, TPM 42 and RBM 44 of the conventional core monitoring system, the ORM 46 operative to prevent an excessive rise in the reactor power level caused by an increase in the core coolant flow rate, before the reactor is scrammed. As a result, various advantages are offered in operating a nuclear reactor by the present invention.

Firstly, when an operator turns the wrong valves, or some equipment misoperates, for example, the core coolant flow rate may abnormally rise and the power may rapidly rise. When this phenomenon occurs, it is possible to inhibit an abnormal transient change in core characteristics (minimum critical power ratio, maximum linear heat generating rate, rated power, flow vibration characteristics, etc.) by blocking or running back an increase in the core coolant flow rate by controlling the recirculation pumps. Secondly, when TPM 42 and APRM 40 are the only monitoring devices used, the reactor is scrammed when the threshold power level is exceeded as a result of a rise in power caused by an increase in the core coolant flow rate. This makes it inevitable to interrupt the operation of the reactor. However, according to the invention, when the threshold power level (about 105% of rated power) of ORM 46 is exceeded, the increase in the core coolant flow rate is blocked or the flow rate is run-back, so that an excessive rise in power due to an increase in flow rate can be inhibited. After the inhibiting action is performed, the core coolant flow rate can easily be returned to a normal flow rate control condition. Thus the invention minimizes the number of times the reactor is scrammed and enables the reactor to be substantially continuously operated with minimum interruption.

Another important advantage offered by the invention is that because of the provision of ORM in addition to TPM and APRM as a system for monitoring the power level caused by a rise of the core coolant flow rate, improvements are provided to the minimum critical power ratio which is the monitor index for preventing the thermal breakdown of the fuel cladding owing to the fact that the scram threshold of TPM and APRM is about 115-120% of the rated power at or near the rated flow rate but ORM has a coolant block and runback threshold which is about 105% of the rated power and thus the range of variations in minimum critical power ratio before the threshold power level is reached can be reduced to $\frac{1}{3}-\frac{1}{4}$ by taking as a reference the range of changes occurring until about 115–120% of the rated power is attained. The same goes for the maximum linear heat generating rate which is the monitor index for preventing the mechanical breakdown of the fuel cladding. Thus as compared with the nuclear reactor having no ORM as disclosed in the aforesaid U.S. Pat. No. 3,565,760, for example, the reactor provided with ORM according to the invention shows no increase in the core characteristics parameters such as minimum critical power ratio and maximum linear heat generating rate above their critical levels which might brought about the breakdown of the fuel cladding, even if the power level is raised in rated operation. Thus a nuclear reactor with ORM could develop higher power than a nuclear reactor of the same design having no ORM.

Figure 7:
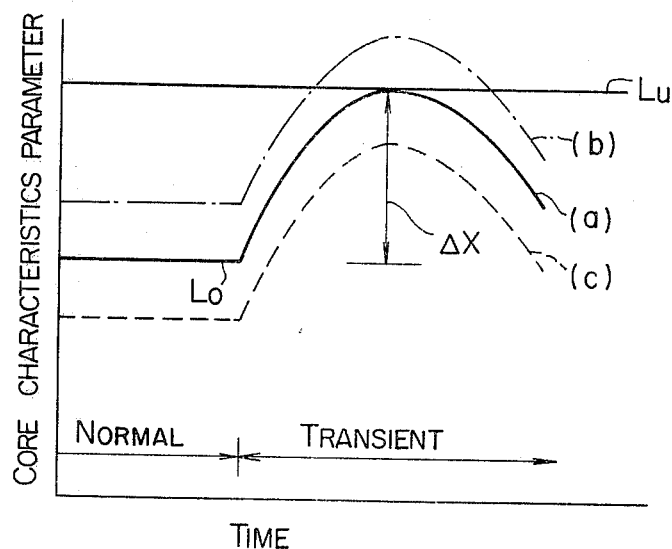
FIG. 7 is a diagram showing the relation between the critical level of a core characteristics parameters that may brought about breakdown of the fuel cladding and the operation critical level of the core characteristics parameter in normal operation.

This feature of the invention will be described in detail by referring to the drawings. Generally, in designing a nuclear reactor, the critical lever Lu of any one of core characteristics parameters that may brought about breakdown of the fuel cladding shown in FIG. 7 is first obtained. Then, the operation critical level Lo of the core characteristics parameter for normal operation is set such that critical lever Lu can be maintained even if an excessive rise in power is caused by the carelessness of an operator or misoperation of some equipment. More specifically, the operation critical level Lo is set in such a manner that, assuming that the core characteristics parameter X vary as indicated by a line (a) in FIG. 7 and the range of variations of the core characteristics parameter are denoted by $\Delta X$, then $Lo \leq Lu - \Delta X$. In FIG. 7, a line (b) represents an unallowable operation condition, and a line (c) is an allowable operation condition in which operation efficiency is lower than in the operation condition represented by line (a). It is essential that in setting the operation critical level Lo, all the factors concerned in a rise in power and all the core characteristics parameters that constitute indices of breakdown of the fuel cladding should be taken into consideration. The principal factors concerned in a rise in power include withdrawing of control rods, an increase in the core coolant flow rate and a rise in the pressure in the core due to shutoff of the load. The indices of breakdown of the fuel cladding include the maximum linear heat generating rate and minimum critical power ratio. The latter can be expressed in terms of the fuel assembly power.

Figure 8:
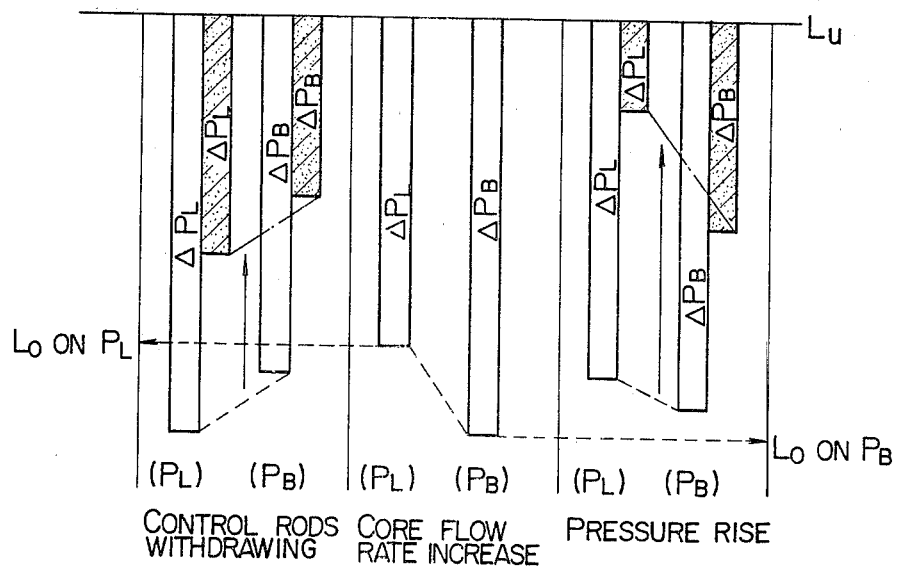
FIG. 8 is a graph showing variations in the linear heat generating rate and the fuel assembly power caused by a excessive rise in reactor power due to withdrawing of control rods, an increase in the core coolant flow rate and a rise in pressure in a nuclear reactor provided with a core monitoring system lacking the ORM shown in FIG. 1.
Figure 9:
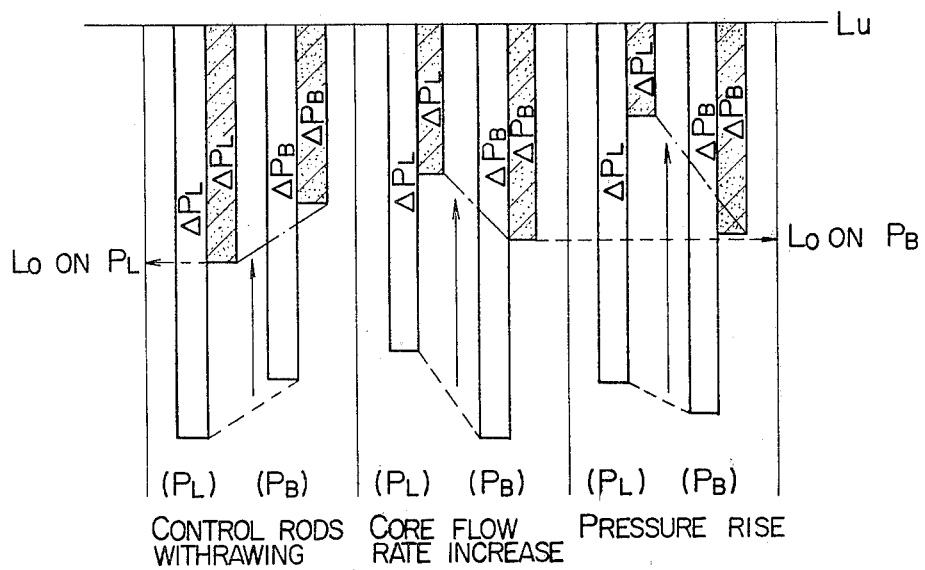
FIG. 9 is a graph similar to that shown in FIG. 8 but dealing with a nuclear reactor provided with the monitoring system shown in FIG. 1.

FIG. 8 show variations $\Delta P_L$ of the maximum linear heat generating rate $R_L$ and variatins $\Delta P_B$ of the fuel assembly power $P_B$ occurring in a nuclear reactor provided with APRM and PBM when a rise in power is caused by the three factors referred to hereinabove. FIG. 9 is a view similar to FIG. 8 but showing the values obtained with a nuclear reactor provided with ORM according to the invention in addition to APRM and RBM. As can be clearly seen in FIG. 8, the provision of APRM and RBM enables $\Delta P_L$ and $\Delta P_B$ to be reduced as indicated by hatching when an excessive power rise is caused by control rod withdrawing and pressure rise, but $\Delta P_L$ and $\Delta P_B$ show no reduction when an excessive power rise is caused by an increase in the core coolant flow rate. This makes it inevitable to set the operation critical level $L_o$ for normal operation of the reactor by taking into consideration such relatively large values of $\Delta P_L$ and $\Delta P_B$. Thus $L_o$ is limited to a low level after all. On the other hand, if ORM is additionally provided $\Delta P_L$ and $\Delta P_B$ can be reduced in all aspects and thus the operation power level of the reactor can be set at a high level.

Figure 10:
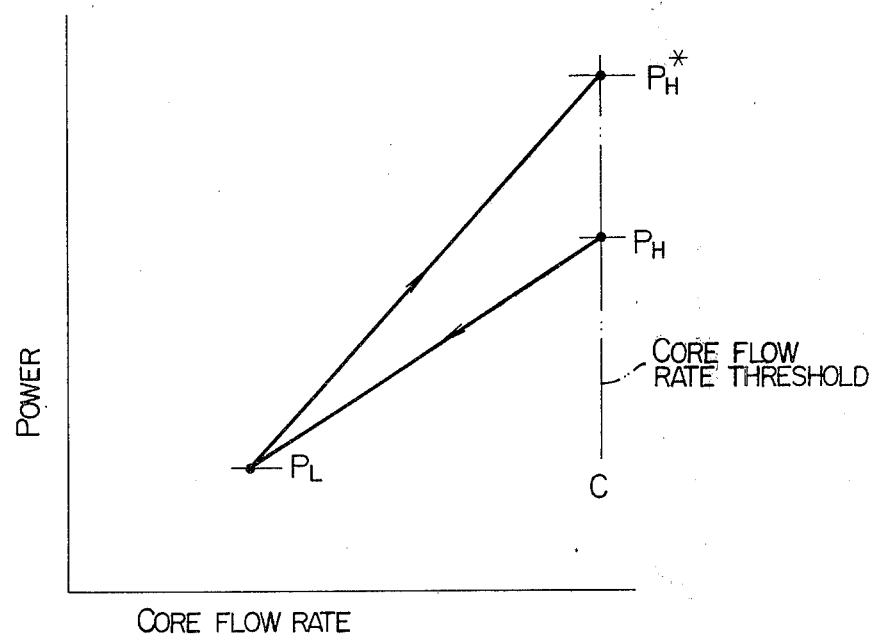
FIG. 10 is a graph showing control of a rise in reactor power caused by a rise in the core coolant flow rate, such control being effected by control means operative to reset the circulation flow rate threshold and the core flow rate threshold only when the power density calculated at a certain time interval exceeds the value obtained by the preceding calculation, to block a further rise in the flow rate above such thresholds.
Figure 11:
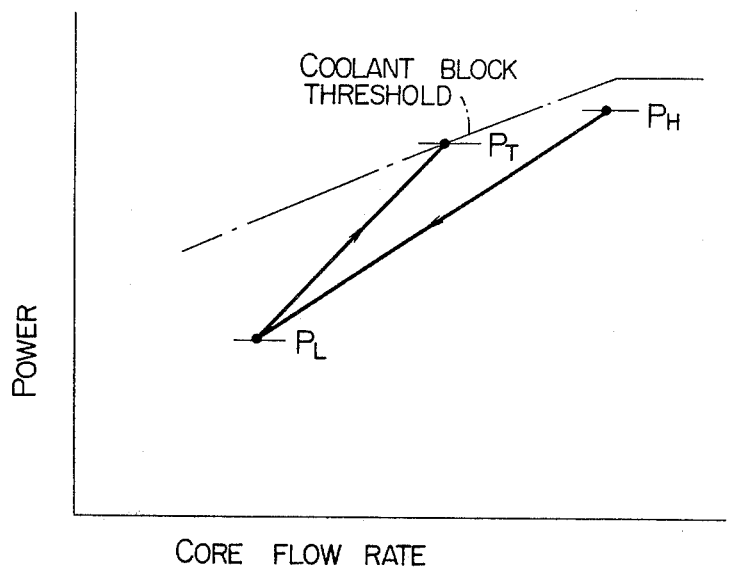
FIG. 11 is a graph similar to that shown in FIG. 10 but showing control of a rise in reactor power by means of a core flow rate control system according to the invention.

A further important advantage of the invention is that since the threshold power level at which ORM is set is determined as a function of the core coolant flow rate, a rise in power can be prevented by all means when the power level reaches the threshold power level corresponding to the prevailing flow rate regardless of the situation in which the power is increased by a rise in the core coolant flow rate. This feature of the invention will be described in detail by referring to FIGS. 10 and 11 and by comparing the power monitoring system according to the invention with the control system disclosed in Japanese Patent Publication No. 21518/79 referred to hereinabove in the background of the invention. The control system of the prior art is provided with means for resetting, in a normal operation mode, the recirculation coolant flow rate threshold M and core coolant flow rate threshold C only when the power density calculated at certain time intervals is higher in level than the value obtained by the preceding calculation, to thereby avoid an increase in flow rate above the threshold levels. In this control system, when the power level is reduced by reducing the core coolant flow rate after the threshold levels M and C are set at a high power level $P_H$ shown in FIG. 10 following a slow and gradual rise in power, the threshold level M would be kept at the high level. If, for example, the flow rate rises due to the failure of the flow control system after the period of a low power $P_L$ has lasted for some time, the flow rate would continue to rise until the level M or C is reached. A power level $P_H{}^*$ attained at this time would be higher than the aforesaid high power level $P_H$ by an amount corresponding to a reduction in the amount of Xenon (neutron absorber) in the core occurring during the time the reactor is operated at the low power level $P_L$. In the case of a reactor provided with ORM according to the invention, when the flow rate begins to rise from the low power $P_L$ under similar circumstances, the power level does not rise above the power level of coolant block threshold as shown in FIG. 11 and the rise in power is blocked at a threshold level $P_T$ corresponding to the prevailing flow rate. That is, according to the invention, even if the power level drops or the amount of Xenon shows a variation prior to the rise in power, it is possible to effectively suppress an excessive rise in power due to a rise in flow rate.

We claim:

1. In a nuclear reactor having a core including means for recirculating a coolant through the core to make a core coolant flow, means associated with said recirculating means for controlling the core coolant flow rate, means for detecting the power level of the reactor and producing a signal indicative of the detected power level, and means for detecting the core coolant flow rate and producing a signal indicative of the detected flow rate, the combination of:

(a) means responsive to the signal from said flow rate detecting means for producing a signal indicative of the maximum threshold power level at the detected flow rate, the threshold being previously determined and inputted to said means as a function of the core coolant flow rate;

(b) means for receiving and comparing the signals from said power level detecting means and said maximum threshold power level signal producing means; and (c) means for producing a coolant block signal or coolant run-back signal when the signal from said power level detecting means exceeds the signal from said maximum threshold power level signal producing means, said coolant block signal or run-back signal being received by said flow rate control means whereby said recirculation means is operated to block the change in the core coolant flow rate or run-back the flow rate.

2. The combination as claimed in claim 1, wherein said flow control means is adapted to control the flow rate along a predetermined flow control line to operate the reactor and wherein said maximum threshold power level is about 103 to 108% of that on said flow control line at the rated flow rate and at flow rates adjacent to the rated flow rate.

3. The combination as claimed in claim 2, wherein said maximum threshold power level is about 102 to 107% of that on said flow control line in a substantial range of flow rates below the first-mentioned flow rates.

4. A nuclear reactor power monitoring system for monitoring the power level of a nuclear reactor and preventing an excessive rise of the power level, the nuclear reactor including a core, a plurality of control rods selectively insertable in said core, means for recirculating a coolant through the core to make a core coolant flow, and means associated with said recirculating means for controlling the core coolant flow rate, the monitoring system comprising in combination:

(a) first means for detecting the power level and producing a signal indicative of the detected power level;

(b) second means for detecting the core coolant flow rate and producing a signal indicative of the detected flow rate;

(c) first monitor means responsive to the signals from said first and second detecting means for blocking the withdrawing of the control rods when the detected power level exceeds a predetermined rod block threshold power level at the detected flow rate;

(d) second monitor means responsive to the signals from said first and second detecting means for initiating a scram action when the detected power level exceeds a predetermines scram threshold level at the detected flow rate; and (e) third monitor means responsive to the signals from said first and second detecting means for blocking the change in the core coolant flow rate or running-back the flow rate when the detected power level exceeds a maximum threshold power level at the detected flow rate, said maximum threshold power level being predetermined and inputted as a function of the core coolant flow rate.

5. A nuclear reactor power control system as claimed in claim 4, wherein said third monitor means includes an averaging circuit for receiving signals from said first detecting means and producing a signal indicative of the average of the detected power level, a coolant block threshold circuit for receiving a signal from said second detecting means and producing a signal indicative of the maximum threshold power level at the detected flow rate, the threshold being previously determined and inputted to said threshold circuit as a function of the core coolant flow rate, a comparator for receiving and comparing signals from said averaging circuit said threshold circuit, and a signal generating means circuit for producing a coolant block signal or coolant run-back signal when the signal from said averaging circuit exceeds the signal from said threshold circuit, said coolant block signal or run-back signal being received by said flow control means whereby said recirculation means is operated to block the change in the core coolant flow rate or run-back the flow rate.

6. A nuclear reactor power control system as claimed in claim 5, wherein said flow control means is adapted to control the flow rate along a predetermined flow control line to operate the reactor and wherein said maximum threshold power level is about 103 to 108% of that on said flow control line at the rated flow rate and at flow rates adjacent to the rated flow rate and is about 102 to 107% of that on said flow control line in a substantial range of flow rates below the first-mentioned flow rates.

* * * * *